US006873921B1

(12) United States Patent
Tucker, Jr.

(10) Patent No.: US 6,873,921 B1
(45) Date of Patent: Mar. 29, 2005

(54) DETECTING PERSONS CONCEALED IN A VEHICLE

(75) Inventor: Raymond W. Tucker, Jr., Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/673,720

(22) Filed: Sep. 29, 2003

(51) Int. Cl.$^7$ .......................... G06F 19/00; G06F 23/16; B60R 25/10
(52) U.S. Cl. ............................. 702/56; 702/76; 702/77; 702/190; 340/429; 340/566
(58) Field of Search ............................... 702/56, 70, 73, 702/74–77, 108, 189–191, 193, 195, 197, 199; 367/136; 340/425.5, 426.1, 429, 426.24, 426.26, 565, 566, 573.1, 539.12, 541; 116/28 R, 33; 180/287, 271; 73/570, 579, 659; 324/76.12, 76.14, 76.21, 76.28; 701/42

(56) References Cited

U.S. PATENT DOCUMENTS

| | | | |
|---|---|---|---|
| 4,096,474 A | | 6/1978 | Greer et al. |
| 4,415,979 A | | 11/1983 | Hernandez |
| 5,814,897 A | * | 9/1998 | Ito et al. .................... 307/10.1 |
| 6,370,481 B1 | | 4/2002 | Gamble |

OTHER PUBLICATIONS

Dress, William B., "Enclosed Space Detection System (ESDS)", Nov. 19–20, 1996, Surveillance and Assessment Technologies for Law Enforcement in Proceedings of the SPIE The International Society for Optical Engineering, vol. 2935, 1997 pp. 140–142.*

Karcel, S. W., "Application of the Smart Portal in Transportation", Nov. 18–20, 1996 In Proceedings of the SPIE The International Society for Optical Engineering, vol. 2902, pp. 231–241.*

Advanced Vehicle Interrogation and Notification (AVIAN) System, as described in "Just a Heartbeat Away," Tech Beat, Oct. 1997, National Institute of Justice, National Law Enforcement and Corrections Technology Center, pp. 1–2.

Dress, W. B., "Applications of a Fast, Continuous Wavelet Transform," Proceedings of the SPIE, Wavelet Applications IV, vol. 3078, pp. 570–580, Apr. 1997.

* cited by examiner

Primary Examiner—Marc S. Hoff
Assistant Examiner—Manuel L Barbee
(74) Attorney, Agent, or Firm—James M. Spicer

(57) ABSTRACT

An improved method for detecting the presence of humans or animals concealed within in a vehicle uses a combination of the continuous wavelet transform and a ratio-based energy calculation to determine whether the motion detected using seismic sensors placed on the vehicle is due to the presence of a heartbeat within the vehicle or is the result of motion caused by external factors such as the wind. The method performs well in the presence of light to moderate ambient wind levels, producing far fewer false alarm indications. The new method significantly improves the range of ambient environmental conditions under which human presence detection systems can reliably operate.

1 Claim, 2 Drawing Sheets

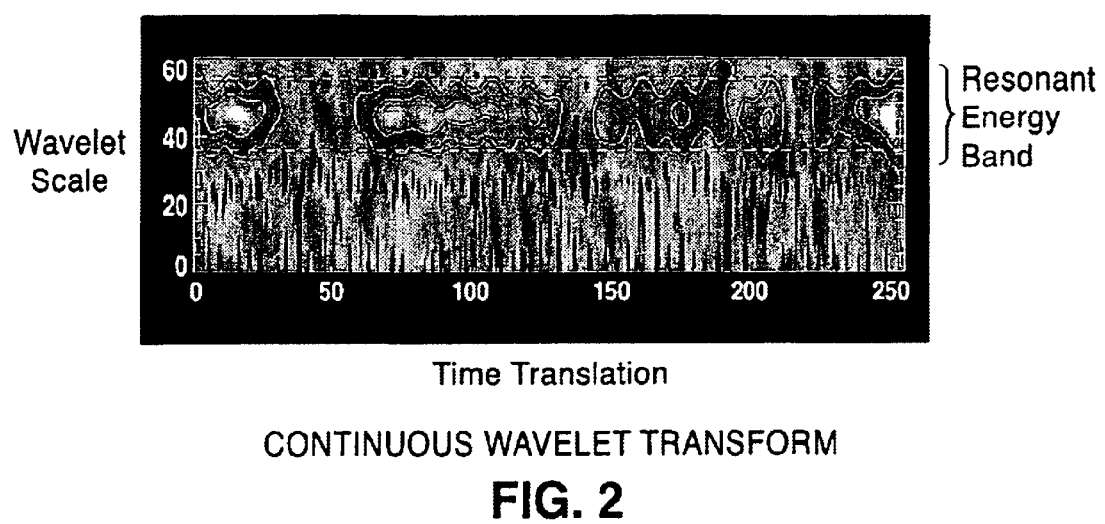
FIG. 2 CONTINUOUS WAVELET TRANSFORM
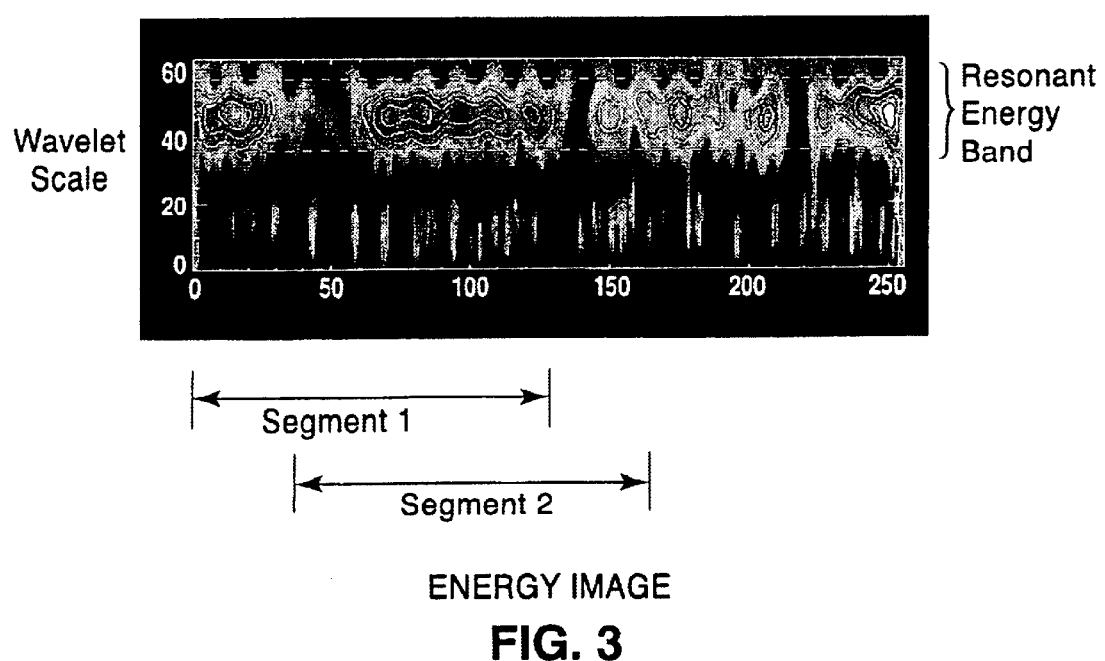
FIG. 3 ENERGY IMAGE

DETECTING PERSONS CONCEALED IN A VEHICLE

STATEMENT REGARDING FEDERALLY SPONSORED RESEARCH OR DEVELOPMENT

The United States Government has rights in this invention pursuant to contract no. DE-AC05-00OR22725 between the United States Department of Energy and UT-Battelle, LLC.

FIELD OF THE INVENTION

The invention relates to detecting humans or animals concealed within a vehicle using seismic sensors placed on the vehicle. More particularly, it relates to a detection method that uses a continuous wavelet transform in combination with a ratio-based energy calculation to determine whether the detected motion is due to the presence of a heartbeat within the vehicle or is the result of motion caused by external factors such as the wind.

BACKGROUND OF THE INVENTION

Human presence detection systems are primarily intended for use at secure portals where it is desirable to search vehicular traffic to assure that no one enters or leaves the secured area by concealing themselves in a vehicle. Usually, two or more sensors are placed on an apparently unoccupied vehicle, and a test is initiated by an operator. The system acquires data from the sensors, performs an analysis of the sensor data, and gives a "pass" or "search" result based on the analysis. Current systems operate with an acceptable degree of reliability when used in the absence of wind or in locations sheltered from the wind. As the level of ambient wind even slightly increases, the reliability of these systems decreases. The primary failure mechanism is an increase in the number of false search indications caused by the wind. This major limitation has been overcome in some applications by using the system indoors, or by erecting barriers to block the wind.

Either of these solutions can significantly increase the cost of using such a system. They also limit its portability, virtually eliminating the ability to use it in temporary "spot checks" at locations where a permanent installation is not practical.

Another limitation of current systems is the means for determining if the wind conditions are outside the range for which the system can operate reliably. In some systems, this determination is based solely on the statistical properties of the sensor data.

In others, a separate sensor is used to sense when wind conditions may not be favorable for analysis. While the use of a separate sensor is more reliable than using the statistical properties of the sensor data, it represents an additional expense to the system, and complicates the system setup and operation. It would be better if a way could be found to determine directly from the sensor data whether the current wind conditions are outside the range of reliable operation of the device.

The limitations of the current systems are due to the signal analysis methods that are used. They make a decision based on the amount of motion energy (power) detected in the input signals. They make no attempt to analyze the nature of the motion in the sensor input signals. The current devices are based on either time domain or frequency domain analysis. While the prior methods allow a quantitative determination of the total motion energy present in the signal, they do not attempt to identify any characteristic and potentially distinguishing features of the motion signature that would indicate whether the motion is due to the presence of a heartbeat or is due to the wind.

The present invention analyzes the types of motion present in the sensor signals and thereby significantly improves the range of ambient environmental conditions under which a human presence detection system can reliably operate.

REFERENCES

1. U.S. Pat. No. 4,096,474, Jun. 20, 1978, "Apparatus for Detecting Persons Hidden in Vehicles", C. B. Greer, et. al. This system uses a seismic transducer as the sensing device and performs a frequency analysis of the input signal.
2. U.S. Pat. No. 4,415,979, Nov. 15, 1983, "Method and Apparatus for Detecting the Presence of an Animate Body in an Inanimate Mobile Structure", W. C. Hernandez. This system also uses a seismic transducer, and employs a time domain power evaluation method for detecting a person concealed in a vehicle.
3. U.S. Pat. No. 6,370,481, Apr. 9, 2002, "Apparatus and Method for Human Presence Detection in Vehicles", T. D. Gamble. This system detects a person in a vehicle by sensing the vehicle vibrations and computing the weighted average amplitude of the signal over multiple resonant frequencies. It provides a separate sensor to sense both wind and ground vibration near the vehicle under the test.
4. Advanced Vehicle Interrogation and Notification (AVIAN) System, as described in "Just a Heartbeat Away", Tech Beat, October 1997, National Institute of Justice, National Law Enforcement and Corrections Technology Center, pp. 1–2. This system performs a multi-resolution analysis that compares the frequency spectrum of a typical ballisto-cardiogram to the vibration spectrum of the vehicle under test.
5. Dress, W. B., "Applications of a Fast, Continuous Wavelet Transform," Proceedings of the SPIE, Wavelet Applications IV, Vol. 3078, pp. 570–580, April 1997.

OBJECTS OF THE INVENTION

It is an object of this invention to utilize a continuous wavelet transform (CWT) as the basis for a heartbeat detection system in a quiescent vehicle.

Another object is to use a combined time-frequency analysis method to differentiate between resonant and non-resonant motion in the vehicle.

Another object is to use a ratio calculation, specifically the ratio of the signal energy in the resonant band to the total signal energy, to detect sustained resonant motion of the vehicle characteristic of the presence of a human heartbeat. The use of a ratio calculation has the distinct advantage of making the test result and the detection threshold value independent of the total signal energy.

Another object is to prevent light-to-moderate winds from causing false alarms merely because of higher total signal energies.

Further and other objects of the invention will become apparent from the description contained herein.

SUMMARY OF THE INVENTION

The invention is a method for detecting the presence of humans or animals in a vehicle, and comprises the steps of acquiring one or more digital channel signal representations of the motion of the vehicle under test using one or more motion sensors placed on the vehicle; computing the continuous wavelet transform of each channel signal to obtain a two-dimensional wavelet-space representation image of the time-frequency distribution of energy within each input signal; computing a corresponding energy image for each channel signal from the wavelet-space representation; computing the total energy in the signal for each channel signal using the energy image; comparing the total energy for each channel signal to a preset maximum and if the total energy in any channel signal exceeds the preset maximum, return an out of limit result for the test; otherwise comparing the total energy for each channel signal to a preset minimum and if the total energy in any channel signal is below the preset minimum, terminate the test and return a pass result; otherwise dividing the energy image for each channel signal into equal-length overlapping segments in time; for each segment of each channel signal, computing the ratio of the resonant frequency energy to the total signal energy; when all segments have been processed, retaining the minimum ratio value as the result of the test; and comparing the result of the test to a preset threshold, and if that result is greater than the threshold value, displaying an indication to search the vehicle, otherwise displaying an indication to pass the vehicle.

BRIEF DESCRIPTION OF THE DRAWINGS

FIG. 2 is a display of the continuous wavelet transform of the signal obtained from one motion sensor placed on a vehicle with one occupant. The regular heartbeat of the person appears in the resonant energy portion of the total measurement band.

FIG. 3 is a display of the corresponding energy image of the continuous wavelet transform of FIG. 2. FIG. 3 also illustrates overlapping time segments used in the resonant energy to total energy ratio computations.

DETAILED DESCRIPTION OF THE INVENTION

Figure 1:
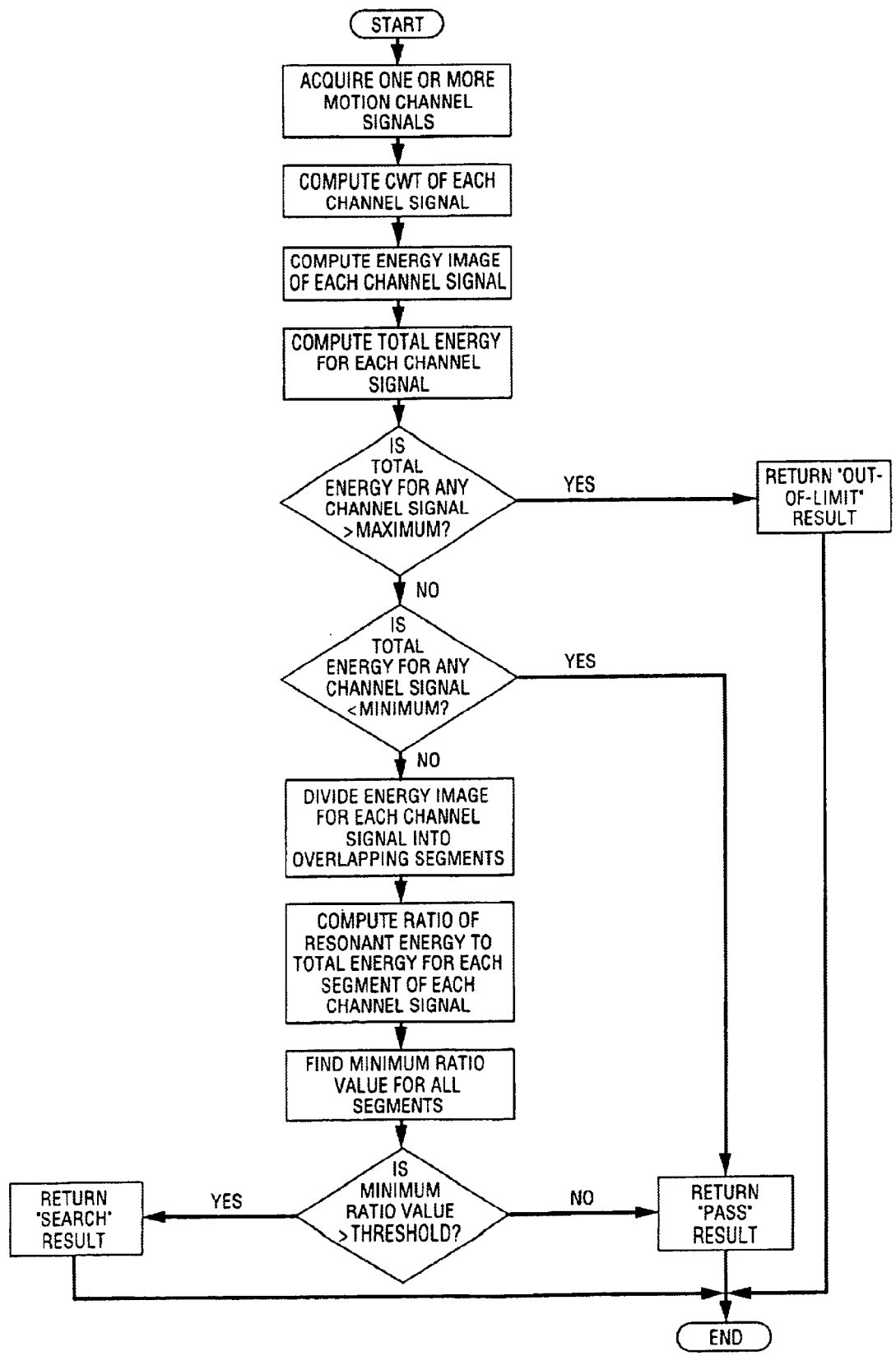
FIG. 1 is a flow diagram illustrating the steps of operation of the detection method of the invention.

The presence of a person or animal concealed in a vehicle produces a sustained resonance of the vehicle suspension at its characteristic resonant frequency. The heartbeat of a person in the vehicle represents an internal mechanical excitation force that is regular in time. However, it is a very weak excitation force that generates detectable motion only because of the high mechanical gain that is present at the resonant frequency of the vehicle suspension. The force is not of sufficient strength to cause any other movement of the vehicle such as pitch, yaw, or rotational motion. The heartbeat will, however, produce a sustained vibration of the vehicle at the suspension resonant frequency. It is well known that it is possible to detect the presence of a human or animal heartbeat from a sustained vibration component at the resonant frequency of the vehicle suspension.

It is also well known that even a small amount of wind can seriously interfere with such measurements. The wind is a relatively random external mechanical force that will induce some combination of pitch, yaw, or rotational motion of the vehicle on its suspension, accompanied by a brief resonant response as the motion is dampened by the suspension. A resonant response caused by the wind should be accompanied, and perhaps preceded, by additional vehicle motion that is most likely not at the suspension resonant frequency. Thus, the presence of wind-induced motion can be identified by significant motion signatures at frequencies other than the suspension resonant frequency accompanied by a brief period of resonant motion. The present invention takes into account such wind-produced motion in an improved method for detecting the presence of a heartbeat in an apparently unoccupied vehicle.

The method is used in conjunction with motion sensors such as vibration sensors and seismic sensors placed on the vehicle frame along with appropriate signal conditioning stages for each motion sensor input channel. The method is implemented on a portable computer system equipped with an analog to digital converter for reading the raw sensor channel signals.

The detection method comprises the following steps.

A) Upon initiation of a test, acquire one or more digital channel signal representations of the motion of the vehicle under test using one or more motion sensors placed on a vehicle in a quiescent state.

B) Compute the continuous wavelet transform of each channel signal to obtain a two-dimensional wavelet-space representation image of the time-frequency distribution of energy within each input signal.

C) Compute a corresponding energy image for each channel signal from the wavelet-space representation.

D) Compute the total energy in the signal for each channel signal using the energy image.

E) Compare the total energy for each channel signal to a preset maximum that represents the upper limit for which the method gives a reliable answer. If the energy in any channel signal exceeds the preset maximum, a warning is displayed indicating that the environmental (wind) conditions exceed those required for reliable operation. The analysis is terminated and returns an "out of limit" result for the test. The option to retest may be given.

F) Otherwise, compare the total energy for each channel signal to a preset minimum that represents the lowest total energy level that could be measured for a channel signal if the vehicle were occupied. If the total energy is below the minimum, the vehicle is unoccupied. The analysis is terminated and returns a "pass" result for the test.

G) Otherwise, divide the energy image for each channel signal into equal-length, overlapping segments in time.

H) For each segment in each channel signal, compute the ratio of the resonant frequency energy to the total signal energy.

I) When all segments have been processed, the minimum ratio value is retained as the result of the test.

J) The result opf the test is then compared to a preset threshold that corresponds to the lowest ratio of resonant energy to total energy that is expected for a given occupied vehicle. If that result is greater than the threshold value, a "search vehicle" result is returned. Otherwise, a "pass" result is returned.

The steps of the method are now described in greater detail.

Step A. Motion signatures are acquired from one or more motion sensors placed on the vehicle. The sensors of choice are seismic sensors, also known as geophones. Accelerometers have also been tested with excellent results. The data acquisition system required to collect the data can be constructed from components available from numerous commercial vendors. A typical hardware configuration would comprise, for example, amplification and lowpass filtering of the sensor input signals, followed by A/D conversion, and then inputting into a digital computer. As the motion signatures of interest consist of relatively low frequency components, the lowpass filter cutoff frequency can be set in the range of 12–15 Hz. A typical sampling rate for the A/D converter is 100 Hz.

Step B. Compute the continuous wavelet transform of the input signal. To exploit the differences in wind- and heartbeat-induced motion mentioned above, both time and frequency information are simultaneously required to characterize the vehicle vibration signature. Wavelet analysis is unique in that it preserves both the time and frequency information contained in the input signal. By using wavelet analysis as the first step in the interpretation of the signature, it is possible to observe and define features that differentiate the vehicular motion caused by the presence of a human heartbeat from that caused by the wind. While the short-term Fourier transform and the discrete wavelet transform used in prior systems produce a time-frequency representation, the continuous wavelet transform tends to give a higher resolution result better suited to the detection problem.

There are a number of published methods for computing the continuous wavelet transform of a time-domain signal. For the invention, the continuous wavelet transform computation method of Dress (5) was chosen. In its simplest form, Dress' method involves the formation of two static matrices that contain the chosen scaled wavelet basis function and the time translation function, respectively. There are a number of parameters used in the generation of these matrices that can be adjusted to emphasize different signal characteristics. For the invention, these parameters have been selected to highlight the differences between resonant and non-resonant vibration of the vehicle. Once these matrices have been properly derived using the Dress guidelines, they are permanently stored and initialized in memory as a part of the overall initialization function of a system. To compute the continuous wavelet transform of an input signal, a diagonal matrix is formed from the frequency-domain representation of the input data. The diagonal data matrix is multiplied by the translation matrix, and the resulting interim matrix is multiplied by the wavelet matrix to obtain a two-dimensional continuous wavelet representation of the signal, as shown in FIG. 2.

Step C. Compute the corresponding energy image. To compute the energy image from the two-dimensional continuous wavelet representation of the signal, the magnitude of each element is squared. Computing the energy image highlights the concentration of motion energy in the two-dimensional time-frequency domain. FIG. 3 shows the energy image of the signal shown in FIG. 2.

Step D. Compute the total energy in the energy image. To compute the total energy in the energy image, all of the individual elements in the energy image are summed.

Step E. Compare the total energy to a preset upper limit. The total energy is compared to a preset limit that corresponds to the maximum energy level for which the system gives reliable results. If the computed energy exceeds the limit, the test is aborted and notification is given to the operator that the environmental conditions are outside the limits of reliable operation. If desired, the operator can be presented with the option to retest. There will always be some upper limit on the amount of ambient wind motion that can be tolerated before the detection method becomes unreliable. For an unoccupied vehicle, there is a one-to-one correspondence between the total energy in the signal and the ambient motion of the vehicle. It is therefore possible for a given hardware embodiment of a system to determine experimentally where the upper limit of reliability lies in terms of the total energy in the input signal. As a statistically-valid number of tests are required to set such a limit, the best embodiment is to have a programmable limit that can be adjusted as operating conditions and experience dictate. It may also be desirable to use different limits for different vehicle types, as high-profile vehicles are more susceptible to wind-induced motion.

Step F. Compare the total energy to a preset lower limit. For situations where the input signal level is low enough to be dominated by random noise effects, it is possible that the distribution of the energy within that signal will randomly match the signature expected for an occupied vehicle. This occurrence is prevented by imposing a minimum energy criterion on each channel. As with the maximum energy limit, a statistically-valid number of tests are required to set such a limit. The best embodiment would have a programmable limit that could be adjusted as operating experience dictates.

Step G. Compute the ratio of resonant energy to total energy. In the wavelet-scale (FIG. 2), and corresponding energy image (FIG. 3) representations, the resonant energy will be contained within a specific wavelet scale band that corresponds to the resonant frequency of the vehicle suspension. For most vehicles, this band corresponds- to a frequency range of 3–6 Hz. The analysis is performed by computing the ratio of the signal energy within the predefined resonant wavelet scale band to the total signal energy for a number of overlapping, fixed-length time windows that are equally spaced over the duration of the test. The present embodiment of the invention uses time windows that are 2.56 seconds in length. Although the ratio value is computed several times for each sensor channel (the actual number depending on the number of input signal samples and the size of the time window used), only the minimum ratio value obtained for each sensor channel is retained as the result.

Step H. For each segment in each channel signal, compute the ratio of the resonant frequency energy to the total signal energy. The use of a resonant energy to total energy ratio has two distinct advantages not seen in the prior art. The ratio helps reduce the sensitivity of the method to the voltage input level of each channel signal, and also results in a high percentage of the motion being detected as resonant, or heartbeat, motion. The overlapping time segments are used to establish that the resonant motion is sustained over long periods of time.

Step I. When all segments have been processed, the minimum ratio value is retained as the result of ther test. If any sensors do not have sufficient mechanical coupling through the vehicle frame to respond at the vehicle's resonant frequency, they can be repositioned closer to the vehicle frame, or their information ignored in favor of other channels.

Step J. The result of the test is then compared to a preset threshold that corresponds to the lowest ratio of resonant energy to total energy that is expected for a given occupied vehicle. If that result is greater than the threshold value, a "search vehicle" result is returned. Otherwise, a "pass" result is returned.

Although the primary application of the invention is to detect persons trying to conceal themselves in a vehicle, an alternate application is detecting persons or animals inadvertently left or trapped in a vehicle. Another possible application would be a system to detect unwanted tampering with an unattended vehicle.

The method could also be modified to search closed containers for human or animal occupants provided that the container can be temporarily placed on a compliant suspension or suspended from a suitably-designed compliant support system.

The invention can be used at any location where it is desirable to search vehicular traffic to assure that no one enters or leaves a secured area by concealing themselves in a vehicle. This would include any point of passage or entry/exit portal where the undetected passage in a vehicle of one or more individuals has a potentially high consequence. Probable uses include, but are not limited to, searching vehicles entering or leaving secure government or military sites, prisons, border crossing points, service entrances to airports, and entrances to piers or shipping docks.

While there has been shown and described what are at present considered the preferred embodiments of the invention, it will be obvious to those skilled in the art that various changes and modifications can be prepared therein without departing from the scope of the invention defined by the appended claims.

I claim:

1. A method for detecting the presence of humans or animals in a vehicle, comprising the steps of:
   a) acquiring one or more digital channel signal representations of the motion of the vehicle under test using one or more motion sensors placed on the vehicle;
   b) computing the continuous wavelet transform of each channel signal to obtain a two-dimensional wavelet-space representation image of the time-frequency distribution of energy within each input signal;
   c) computing a corresponding energy image for each channel signal from the wavelet-space representation;
   d) computing the total energy in the signal for each channel signal using the energy image;
   e) comparing the total energy for each channel signal to a preset maximum and if the total energy in any channel signal exceeds the preset maximum, return an out of limit result for the test; otherwise
   f) comparing the total energy for each channel signal to a preset minimum and if the total energy in any channel signal is below the preset minimum, terminate the test and return a pass result; otherwise
   g) dividing the energy image for each channel signal into equal-length overlapping segments in time;
   h) for each segment of each channel signal, computing the ratio of the resonant frequency energy to the total signal energy;
   i) when all segments have been processed, retaining the minimum ratio value as the result of the test; and
   j) comparing the result of the test to a preset threshold, and if that result is greater than the threshold value, displaying an indication to search the vehicle, otherwise displaying an indication to pass the vehicle.

* * * * *